Feb. 23, 1932.  C. L. HAWES  1,846,595
AUTOMOBILE RADIATOR ORNAMENT
Filed Sept. 8, 1930
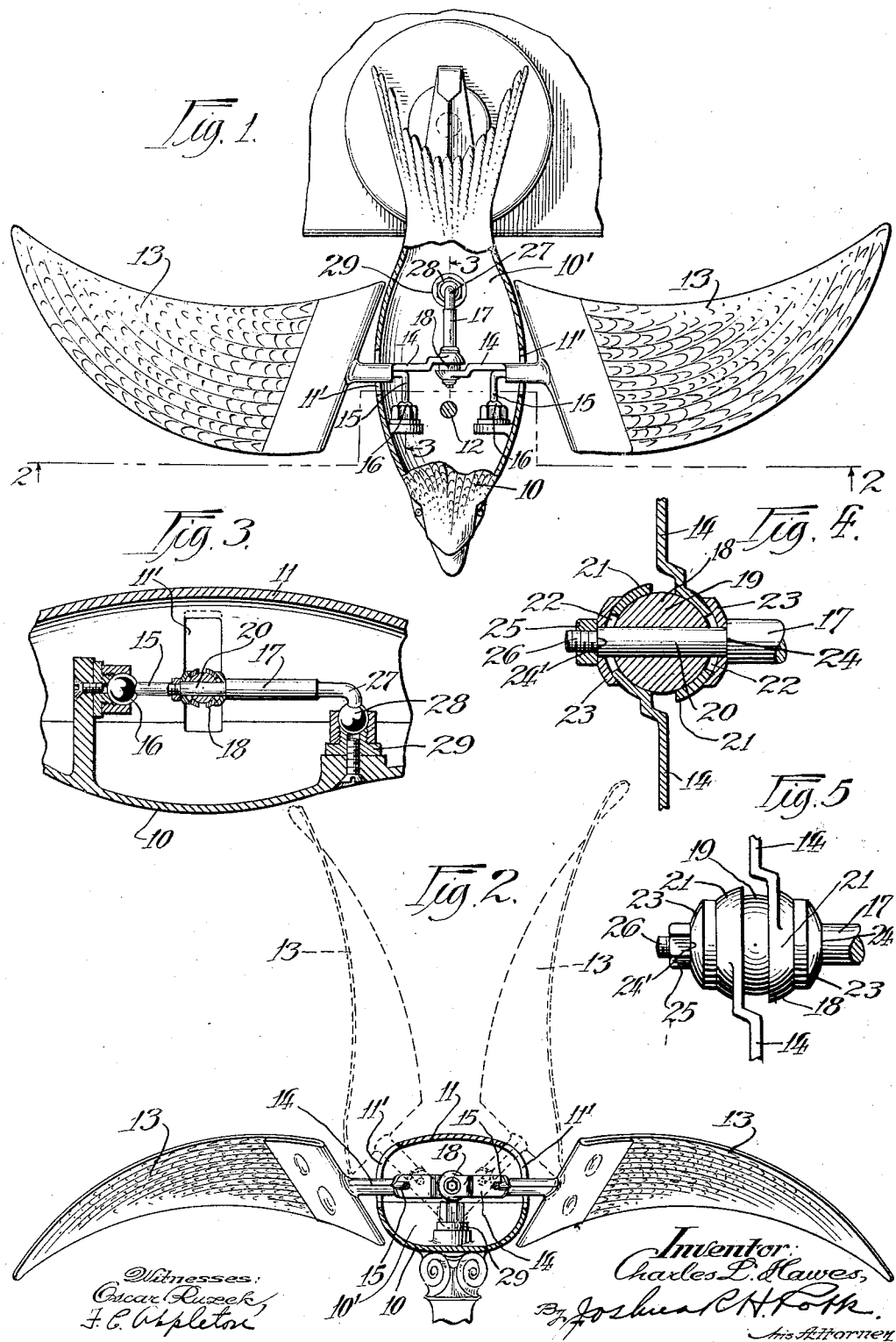

Patented Feb. 23, 1932

1,846,595

UNITED STATES PATENT OFFICE

CHARLES L. HAWES, OF CHICAGO, ILLINOIS, ASSIGNOR OF ONE-HALF TO CHRISTOPHER STRASSHEIM, OF CHICAGO, ILLINOIS

AUTOMOBILE RADIATOR ORNAMENT

Application filed September 8, 1930. Serial No. 480,414.

This invention relates to automobile radiator ornaments, and it has for its object to produce a neat and attractive mechanical device of simple, easily operated and durable structure, simulating a bird in flight, which may be mounted on a radiator cap or other part of an automobile or like vehicle, the wings of the simulated bird being operated automatically by the wind or air pressure created when the vehicle is in motion.

The invention consists in the novel structure and in the parts and combinations and arrangements thereof as hereinafter described and pointed out with particularity in the appended claims.

In the accompanying drawings, illustrating a practical adaptation of the invention,—

Fig. 1 is a view, partly in top plan and partly in horizontal section, illustrating the simulated bird with wings spread and in lowered position;

Fig. 2 is a transverse section on the line 2—2 of Fig. 1;

Fig. 3 is a fragmentary longitudinal section, on an enlarged scale;

Figs. 4 and 5 are detail views of the intermediate universal joint employed in the structure.

Referring now to the drawings, the numeral 10 designates the body portion of the simulated bird, the same comprising a hollow casing or shell 10', an upper section 11 thereof being removable and secured in place by a bolt 12. The wing members 13 are curved longitudinally and transversely so as to be cupped somewhat from the under side, and they are also set in their normal lowered position at an inclination in the longitudinal direction of travel of the object whereby the air pressure will readily lift them, and shaped so that in their raised position the upper sides of the wings are presented at an angle to the action of the air pressure, which, together with the natural gravitating tendency, causes the wings to return to lowered position.

The wing members 13 are provided with supporting stem portions 14, at the middle portion of which are forwardly extending substantially horizontal arms 15, said arms being pivotally supported by universal joints 16, preferably of the ball and socket type, on lugs provided on the lower portion of the body 10. These arms 15 are rigid extensions of the wing supporting stems 14, and may obviously be formed integral therewith or made separately and securely attached thereto. As shown in the drawings, the arm 15 is an angular wire section, one leg of which is secured under the folded marginal portions of the supporting member 14 which is formed of sheet metal.

The meeting inner end portions of the wing supporting stems 14 are secured together and to a medial longitudinally extending support 17 by a universal joint 18, preferably of the ball and socket type, as shown. This jointure includes a ball 19 having a diametrical opening therethrough whereby it may be placed on the reduced end portion 20 of said longitudinal supporting member 17, the end portions of the wing supporting stems 14 being cupped, as at 21, to fit on opposite sides of the ball and having central apertures 22 of considerably larger diameter than said reduced end portion 20 of the longitudinal supporting member 17. Cooperating with the cupped portions 21 of the member 14 are cupped washers 23 whose central apertures are just slightly larger than the diameter of the reduced end portion 20 of the member 17 on which they are loosely fitted. At the base of the reduced portion 20 of the member 17 is a shoulder 24 between which and a shoulder 24' near the outer end of the portion 20 said ball 19 and cooperating members 21 and 23 are held in close but freely movable relation to each other by a nut 25 which is applied to the screw-threaded outer end portion 26 and tightened against the shoulder 24'.

The rear end portion of the longitudinal supporting member 17 is reduced and turned at an angle, as at 27, and is pivotally supported at its extreme end, by a ball and socket joint 28, on a lug 29 extending upwardly from the body portion 10. By the foregoing described arrangements the wing members 13 are movably supported in a stable manner, yet their actuation is extremely sensitive and the proper angularity of the wings is effected at the termination of their up and down movements.

When the device is stationary the wing members 13 are normally in lowered position with their under sides presented angularly towards the longitudinal direction of travel, and in operation the wind pressure lifts said wing members which swing about the axes of the arms 15 which are normally substantially horizontal and in parallel longitudinal relation. Naturally, as the inner end portions of the wing supporting stems 14 are hingedly connected by the universal joint 18 these portions move downwardly with the axis of the jointure in a direct vertical plane, the effect being to cause the arms 15 to swing inwardly from their supporting ball and socket jointures 16 in convergent relation to each other, and as the longitudinally extending medial support 17 is connected at one end to the wing supporting stems 14 by the universal jointure 18 and is hingedly supported at its opposite end on the lug 29 the downward breaking movement of the joined end portions 21 of the members 14 is limited to some extent, whereby, after the wing members 13 have moved upwardly some distance, said universal jointure 18 becomes the fulcrum point for said members 14 which then swing upwardly therefrom and, owing to the rigid connection of the arms 15 to the members 14 and said arms 15 being supported at their ends by the universal joints 16, the wing members are thrown slightly forward at the limit of their upward movement, and also the top faces of the wing members are presented in convergent relation to each other with respect to the action of the wind or air pressure, the effect of which is to restore the wing members to normal lowered position, this alternate up and down movement of the wings continuing as long as the vehicle on which the ornament is mounted is in motion or there is sufficient wind pressure to operate the wings.

Obviously, the structure admits of considerable modification in many respects without in the least departing from the spirit of the invention as defined by the appended claims. The invention, therefore, is not limited to the specific construction and arrangement shown in the accompanying drawings.

Having thus described my invention, what I claim as new and desire to secure by Letters Patent is:

1. In a device of the character described, a simulating object having movably supported lateral wing members, said support comprising cooperating transversely disposed supporting elements having longitudinally extending arms, said supporting elements being pivotally connected at their meeting ends by a universal jointure and said arms being supported at their ends by universal joints, and a longitudinally extending medial supporting element pivotally connected at one end to the meeting end portions of said transversely disposed supporting elements and hingedly supported at its opposite end.

2. In a device of the character described for simulating the wing movement of a bird in flight or the like, a body portion, wing members movably supported on said body member in normally lowered spreading relation and disposed angularly with their under sides in inclined working position with respect to the action of wind pressure from the longitudinal direction of movement of the device, said wing members having inwardly extending opposed transverse supporting elements, said supporting elements having normally parallel longitudinally extending arms, said arms being supported by universal jointures at their ends, a longitudinally extending medial supporting element connected at one end to the meeting ends of said transverse inwardly extending wing supporting elements by a universal jointure, the opposite end of said medial supporting member being hingedly supported, whereby the top face of said wing members is presented convergently in relation to each other and in working position for the action of the wind pressure when said wing elements are in raised condition.

In testimony whereof I have signed my name to this specification.

CHARLES L. HAWES.